US 8,788,640 B1

(12) United States Patent
Masters

(10) Patent No.: US 8,788,640 B1
(45) Date of Patent: Jul. 22, 2014

(54) EMPLOYING RATE SHAPING CLASS CAPACITIES AND METRICS TO BALANCE CONNECTIONS

(75) Inventor: Richard R. Masters, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 1110 days.

(21) Appl. No.: 11/230,854

(22) Filed: Sep. 20, 2005

Related U.S. Application Data

(60) Provisional application No. 60/709,130, filed on Aug. 16, 2005.

(51) Int. Cl.
*G06F 15/16* (2006.01)

(52) U.S. Cl.
USPC ........... 709/223; 709/238; 370/232; 370/468; 455/560

(58) Field of Classification Search
USPC ............ 709/223, 238; 370/232, 468; 455/560
See application file for complete search history.

(56) References Cited

U.S. PATENT DOCUMENTS

| | | | |
|---|---|---|---|
| 5,970,048 A | 10/1999 | Pajuvirta et al. | |
| 5,978,356 A | 11/1999 | Elwalid et al. | |
| 6,064,650 A | 5/2000 | Kappler et al. | |
| 6,125,397 A | 9/2000 | Yoshimura et al. | |
| 6,331,986 B1 * | 12/2001 | Mitra et al. | 370/468 |
| 6,442,138 B1 * | 8/2002 | Yin et al. | 370/232 |
| 6,680,907 B1 | 1/2004 | Bonaventure | |
| 6,798,741 B2 | 9/2004 | Lodha et al. | |
| 6,801,500 B1 | 10/2004 | Chandran | |
| 6,937,568 B1 | 8/2005 | Nicholl et al. | |
| 6,965,930 B1 * | 11/2005 | Arrowood et al. | 709/223 |
| 2002/0059408 A1 * | 5/2002 | Pattabhiraman et al. | 709/223 |
| 2003/0036408 A1 * | 2/2003 | Johansson et al. | 455/560 |
| 2005/0160171 A1 * | 7/2005 | Rabie et al. | 709/227 |
| 2006/0085559 A1 * | 4/2006 | Lownsbrough et al. | 709/238 |

OTHER PUBLICATIONS

F5 Networks, Inc., "BIG-IP Reference Guide Version 4.5", MAN-0044-01, Introductory Page, Chapters 12, 14 and 16, 2002.
F5 Networks, Inc., "BIG-IP Link Controller Solutions Guide Version 4.5", MAN-0053-01, 2002.
Duffy, Jim, "Switching shindig: Extreme to debut load-balancing, cache re-direction technologies", Network World, pp. 1-3, May 8, 2000. http://www.networkworld.com/news/2000/0508extreme.html.
Jacobs and Eleftheriadis, "Streaming Video using Dynamic Rate Shaping and TCP Congestion Control", Department of Electrical Engineering and Columbia New Media Technology Center, pp. 1-29, Jan. 21, 1998.

(Continued)

*Primary Examiner* — Phuoc Nguyen
*Assistant Examiner* — Kishin G Belani
(74) *Attorney, Agent, or Firm* — John W. Branch; Lowe Graham Jones PLLC

(57) ABSTRACT

A method, system, and apparatus for integrating a rate shaping class analysis with a load balancing decision across multiple network links to improve traffic management decisions. For each of the available multiple network links, a determination is made as to how much bandwidth is available to each class associated with that network link. When a request for a connection is received, the request's class is determined. A load balancing decision is based on the available bandwidths for the determined class for the request. The invention may also integrate other Quality of Service metrics into the load balancing decision, including link type, failure rates, or the like.

19 Claims, 5 Drawing Sheets

(56) References Cited

OTHER PUBLICATIONS

Allen, Doug, "Layer-7 Load Balancers Pack New Punch: Next-generation switches combine layer-7 intelligence and security to optimize the data center", F5 Networks, Inc., Network Magazine. pp. 1-6, Sep. 4, 2003. http://www.f5.com/communication/articles/archive00/article090403.html.

Cisco Systems, Inc., "Cisco ONS 15454 Ethernet Rate-Shaping Application Note", Cisco Systems, Inc. Application Note, pp. 1-3, 2000.

Martin, Scott, "WAN Rate Shaping with NATing Loopback Interfaces", River Stone Networks, pp. 1-4, May 12, 2001. http://www.riverstonenet.com/support/configdb/0023.html.

Radware Inc., "Bandwidth Management White Paper", Radware Inc. Mahwah, NJ, pp. 1-13, Nov. 3, 2004.

Bonaventure and De Cnodder, "A Rate Adaptive Shaper for Differentiated Services", RFC 2963, pp. 1-19, Oct. 2000.

MacVittie, Lori, "Bandwidth Regulators", Network Computing, pp. 1-21, May 28, 2001. http://www.networkcomputing.com/1211/1211F3.html.

Lancaster, Tom, "Traffic policing and shaping", SearchNetworking.com, pp. 1-3, May 30, 2002. http://searchnetworking.techtarget.com/tip/1,289483,sid7_gci826874,00.html.

Information Sciences Institute, "Transmission Control Protocol: Darpa Internet Program Protocol Specification", Postel, Jon ed., RFC 793, pp. 1-41, Sep. 1981.

Reardon, Marguerite, "A Smarter Session Swithc: Arrowpoint's CS Session Switches Boast the Brains Needed for E-Commerce," Data Communications, Jan. 1999, title page, pp. 3, 5, 18.

Hewitt, John R. et al., "Securities Practice and Electronic Technology," Corporate Securities Series, (New York: Law Journal Seminars-Press) 1998, title page, bibliography page, pp. 4.29-4.30.

* cited by examiner

EMPLOYING RATE SHAPING CLASS
CAPACITIES AND METRICS TO BALANCE
CONNECTIONS

CROSS-REFERENCE TO RELATED
APPLICATIONS

This application claims the benefit of U.S. Provisional Application Ser. No. 60/709,130 entitled "Employing Rate Shaping Class Capacities And Metrics To Balance Connections," filed on Aug. 16, 2005, the benefit of the earlier filing date of which is hereby claimed under 35 U.S.C. §119 (e) and which is further incorporated herein by reference.

FIELD OF THE INVENTION

The invention relates generally to computing connectivity, and more particularly but not exclusively to managing a client's connectivity to data based, in part, on rate shaping classes and metrics.

BACKGROUND OF THE INVENTION

The Internet has evolved into a ubiquitous network that has inspired many companies to rely upon it as a major resource for doing business. For example, many businesses may utilize the Internet, and similar networking connectivity, to manage critical applications, access content servers, automate assembly and production lines, and implement complex control systems. Support for such mission critical applications, distribution of information, marketing, and other forms of network traffic rely more heavily on network connectivity than ever before.

Unfortunately, due to the nature of networking traffic, many businesses have realized that network congestion appears to go hand in hand with successful use of this network connectivity. Thus, when network congestion occurs, administrators may attempt to increase overall bandwidth of a network by adding more network links. However, the underlying problem of network congestion may remain, since control over the bandwidth may remain limited if not non-existent. Moreover, attempting to manage the flow of network traffic across multiple network links may result in increased costs with ineffective use of the available bandwidth. Therefore, it is with respect to these considerations, and others, that the present invention has been made.

BRIEF DESCRIPTION OF THE DRAWINGS

Non-limiting and non-exhaustive embodiments of the invention are described with reference to the following drawings. In the drawings, like reference numerals refer to like parts throughout the various figures unless otherwise specified.

For a better understanding of the invention, reference will be made to the following Detailed Description of the Invention, which is to be read in association with the accompanying drawings, wherein.

DETAILED DESCRIPTION OF THE INVENTION

Figure 1:
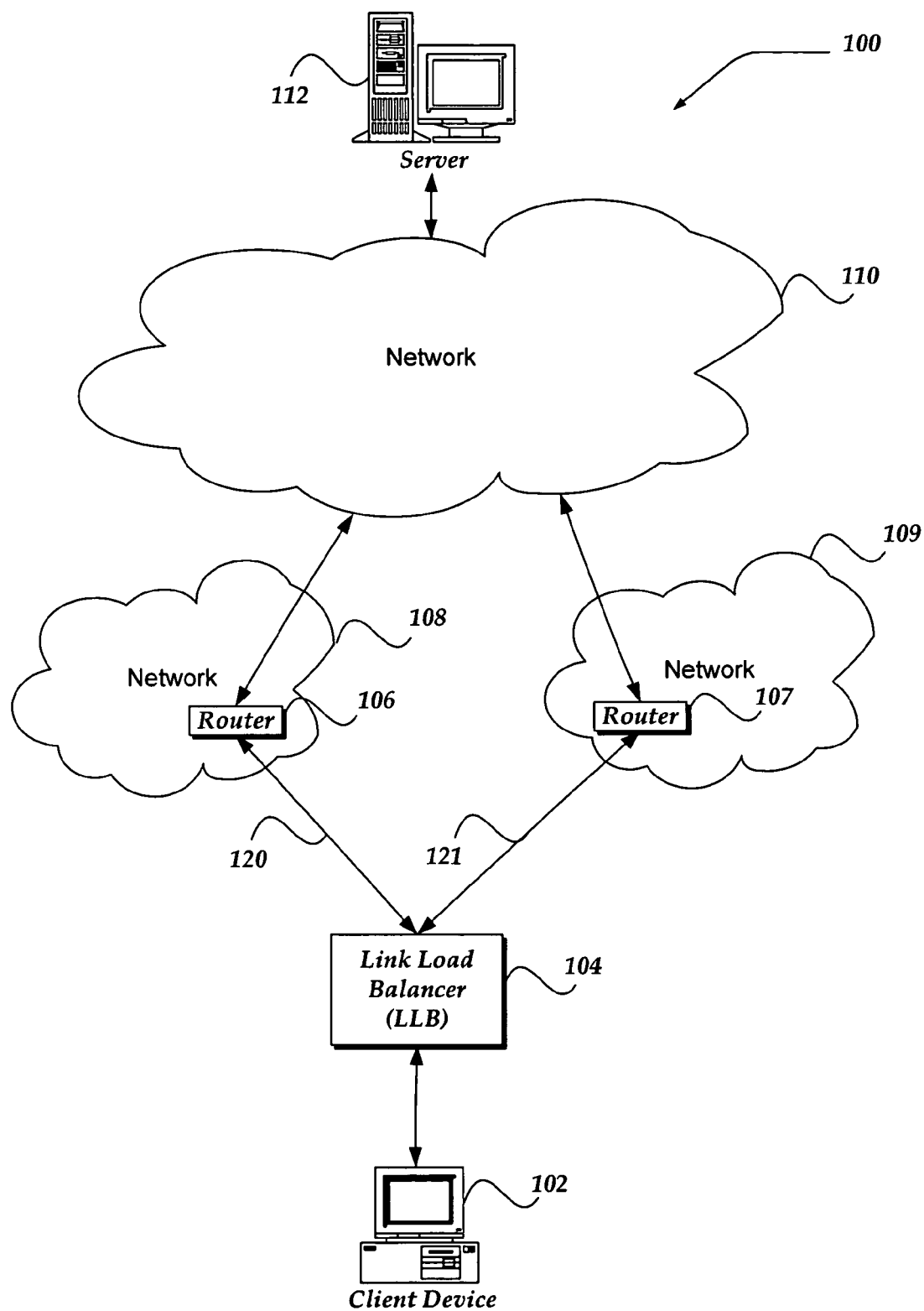
FIG. 1 shows a functional block diagram illustrating one embodiment of an environment for practicing the invention.

The invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods or devices. Accordingly, the invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Nor does the phrase "in another embodiment" necessarily refer to a different embodiment, although it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The term 'link" refers to a physical medium that is used to connect two or more computing devices sometimes called network nodes. Links may be implemented using, for example, coaxial cables, fibers, satellites, Digital Subscriber Lines (DSL), and so forth. Links may be dedicated to two network nodes, or be shared by many network nodes.

The term "network connections" is directed towards various communication interfaces, protocols or the like, that enables a computing device to communicate with another computing device over a network. One such network connection may be a TCP connection. TCP connections are virtual connections between two network nodes, and are typically established through a TCP handshake protocol. The TCP protocol is described in more detail in Request for Comments 793, which is available at http://www.ietf.org/rfc/rfc0793.txt?number=793.

Briefly stated, the invention is directed towards a system, apparatus, and method for load balancing network traffic, including a client request for a resource, based on an integrated determination of classes and traffic loads for a plurality of network links that can provide for the class associated with the client's request. That is, generally, the invention employs an integrated determination of classes and a load balancing mechanisms to select a network link for the client's request. For each of the available plurality of network links, a determination is made as to how much of a link resource is available for each class associated with that network link. In one embodiment, the link resource is bandwidth. In another embodiment it is a percent availability of bandwidth. When the client's request for a connection is received, the request's class is determined. The plurality of network links may then be load balanced based on available link resource for the class for the request. The invention may also integrate other Quality of Service (QoS) metrics into the load balancing decision, including link type, failure rates, or the like. In one embodiment, a weighted combination of the other metrics and the rate shaping metrics may be integrated into the load balancing decision.

Rate shaping is directed towards a mechanism of intervening in network traffic flows between two or more endpoints and modifying the network traffic flow between them such that the end to end communications substantially complies with a determined service level for the respective network flow. Such service levels typically specify various link resource expectations, such as peak packet transmission rates, peak rate tolerances, minimum bandwidth availability, mean bandwidth availability, percent bandwidth availability, and so forth, for certain classes of network flows over a network link. Such classes are defined to cause each of the network traffic flows to fall into mutually exclusive categories. Classes of services typically offered over the network, include, for example, video-on-demand and video conferencing traffic, Hyper Text Transport Protocol (HTTP) traffic, FTP traffic, Peer-to-Peer (P2P), and the like.

Illustrative Operating Environment

FIG. 1 illustrates one environment in which the invention may operate. However, not all of these components may be required to practice the invention, and variations in the arrangement and type of the components may be made without departing from the spirit or scope of the invention. Generally, system 100 of FIG. 1 represents an environment in which a request for a resource may be load balanced across multiple network links, using an integrated rate shaping/load balancing approach.

As shown in the figure, system 100 includes client device 102, Link load balancer (LLB) 104, networks 108-110, routers 106-107, and server 112.

LLB 104 is in communication with and enables communications between client device 102 and networks 108-109 through routers 106-107 respectively. Routers 106-107 are in further communication and enables communication through networks 108-109, respectively, with LLB 104 and network 110. Server 112 is also in communication with network 110.

Generally, client device 102 may include virtually any computing device capable of connecting to another computing device to send and receive information, including emails, browser transactions, requests for information from a server, and the like. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, radio frequency (RF) devices, infrared (IR) devices, integrated devices combining one or more of the preceding devices, or virtually any mobile device. Similarly, client device 102 may be any device that is capable of connecting using a wired or wireless communication medium such as a PDA, POCKET PC, wearable computer, and any other device that is equipped to communicate over a wired and/or wireless communication medium.

Client device 102 may further include a client application that is configured to manage various actions. Moreover, client device 102 may also include a web browser application, that is configured to enable an end-user to interact with other devices and applications, over a network. In one embodiment, the web browser is configured to provide various functions, including, but not limited to, authentication, enabling multiple requests for information, and the like. The web browser may further enable inputs, such as keyboard, mouse, audio, and the like.

Networks 108-110 are configured to couple one network device with other network devices. Networks 108-110 are enabled to employ any form of computer readable media for communicating information from one electronic device to another. In one embodiment, network 110 is the Internet. In one embodiment, networks 108-109 represent networks associated with an Internet Service Provider (ISP), or the like.

Networks 108-110 may include local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, to enable messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

Networks 108-110 may further employ a plurality of wireless access technologies including, but not limited to, 2nd (2G), 3rd (3G) generation radio access for cellular systems, Wireless-LAN, Wireless Router (WR) mesh, and the like. Access technologies such as 2G, 3G, and future access networks may enable wide area coverage for network devices with various degrees of mobility. For example, Networks 108-110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like.

Furthermore, remote computers and other related electronic devices could be remotely connected to either LANs or WANs via a modem and temporary telephone link. In essence, Networks 108-110 include any communication method by which information may travel between one network device and another network device.

Additionally, Networks 108-110 may include communication media that typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as, but not limited to, twisted pair, coaxial cable, fiber optics, wave guides, and other wired media and wireless media such as, but not limited to, acoustic, RF, infrared, and other wireless media.

Although not illustrated, a network may also enable communications between LLB 104 and client device 102. For example, LLB 104 and client device 102 may reside on a same LAN.

Routers 106-107 represent virtually any network device that receives and routes a network packet towards a destination. Routers 106-107 are typically employed to extend or segment networks by routing the network packet from one subnet to another. As shown in the figure, Routers 106-107 may represent a router existing on a network border.

One of routers 106-107 may receive a network packet from LLB 104, through networks 108-109, respectively, and route it towards server 112 through network 110. Similarly, one of routers 106-107 may receive the network packet from server 112 through network 110, and route it towards LLB 104.

Routers 106-107 may read a network address in the received packet and make a decision on how to route it based on any of a variety of dynamic routing protocols, including distance vector protocols, link state protocols, hybrid protocols, or the like.

Routers 106-107 typically operates at layer three of the typical Open Systems Interconnection (OSI) reference model for networking. However, routers 106-107 may also provide additional functionality that operates above layer three for TCP/IP in the OSI reference model, and the like.

Routers 106-107 may include virtually any specialized computer that is optimized for communications. Routers 106-107 may also represent a set of router actions that are incorporated into a server, network card, and the like. Routers 106-107 may also be implemented as a network-layer bridge, gateway, layer three switch, or the like.

Server 112 may include any computing device capable of communicating packets with another computing device. Each packet may convey a piece of information. A packet may be sent for handshaking, i.e., to establish a connection or to acknowledge receipt of data. The packet may include information such as a request, a response, or the like. Generally, packets received by server 112 will be formatted according to TCP/IP, but they could also be formatted using another transport protocol, such as User Datagram Protocol (UDP), Internet Control Message Protocol (ICMP), NETbeui, IPX/SPX, token ring, and the like. Moreover, the packets may be communicated between server 112 and network 110 employing HTTP, HTTPS, and the like.

In one embodiment, server 112 is configured to operate as a web server. However, server 112 is not limited to a web server, and may also operate messaging server, File Transfer Protocol (FTP) server, database server, content server, or the like. Moreover, while server 112 may operate as other than a website, they may still be enabled to receive an HTTP communication.

Devices that may operate as server 112 include personal computers, desktop computers, multiprocessor systems, microprocessor-based or programmable consumer electronics, network PCs, servers, and the like.

One embodiment of LLB 104 is described in more detail below in conjunction with FIG. 3. Generally, however, LLB 104 includes virtually any device that manages network traffic. Such devices may monitor a health and availability of network links and potentially direct traffic based on any of a variety of criteria. Such devices include, for example, routers, proxies, firewalls, link load balancers, virtual private network (VPN) server, load balancers, cache devices, gateways, devices that perform Network Address Translation (NATs), port translations, sequence translations, or the like, any combination of the preceding devices, and the like. Thus, in one embodiment, LLB 104 may inspect incoming network packets, and may perform an address translation, port translation, a packet sequence translation, and the like, and route the network packet based, at least in part, on the packet inspection.

In one embodiment, LLB 104 may perform a packet-by-packet content switching decision for client-side requests. Thus, LLB 104 may, for example, control the flow of data packets forwarded from a client device, such as client device 102 towards a server, such as server 112. LLB 104 may direct a request to a particular network link based on network traffic, network topology, content requested, a quality of service (QoS), a rate class associated with the request, and a host of other traffic distribution mechanisms.

LLB 104 may further integrate rate shaping decisions with the load balancing decisions to load balance network traffic across a plurality of network links, such as network links 120-121. For example, LLB 104 may determine a rate class for the current client request. LLB 104 may further determine an available link resource, such as bandwidth, for the rate class for the plurality of network links. LLB 104 may then load balance traffic that includes the current client request across the network links based on the available link resource for each network link. In one embodiment, LLB 104 may further employ a weighted combination of several network metrics to select a network link that balances loads, including the current request, across the plurality of available network links. LLB 104 may employ a process substantially similar to that described below in conjunction with FIGS. 4-5 to perform an integrated traffic shaping/load balancing decision.

LLB 104 also may recognize packets that are part of the same communication, flow, and/or stream and may perform special processing on such packets, such as directing them to the same network link so that state information is maintained. Thus, in one embodiment, LLB 104 may reuse an existing connection when selecting a network link based on an integrated determination of class and traffic loads. LLB 104 also may support a wide variety of network applications such as web browsing, email, telephony, streaming multimedia and other traffic that is sent in packets.

LLB 104 may communicate with client device 102 using any of a variety of network communication protocols, including TCP/IP, HTTP, and UDP, as well as any of a variety of other connection-oriented or connectionless protocols, or the like. As such, LLB 104 may be configured to perform session setups, teardowns, sequencing, acknowledgements, flow control, and the like, between itself and another network device. Moreover, LLB 104 may also be configured to manage connection aggregation wherein multiple client devices may be enabled to provide requests on a same client-side connection. LLB 104 may further open and manage a connection pool for connections with multiple client devices (not shown).

LLB 104 may be implemented using one or more personal computers, servers, multiprocessor systems, microprocessor-based or programmable consumer electronics, network PCs, radio frequency (RF) devices, infrared (IR) devices, integrated devices combining one or more of the preceding devices, and the like. Such devices may be implemented solely in hardware or in hardware and software. For example, such devices may include some application specific integrated circuits (ASICs) coupled to one or more microprocessors. The ASICs may be used to provide a high-speed switch fabric while the microprocessors may perform higher layer processing of packets. The BIG-IP® family of link load balancers and traffic managers, by F5 Networks, Inc. of Seattle, Wash., are examples of products that may provide the above actions. The FirePass Controller is another example of products by F5 Networks, Inc. may also be used to provide the above actions.

Figure 2:
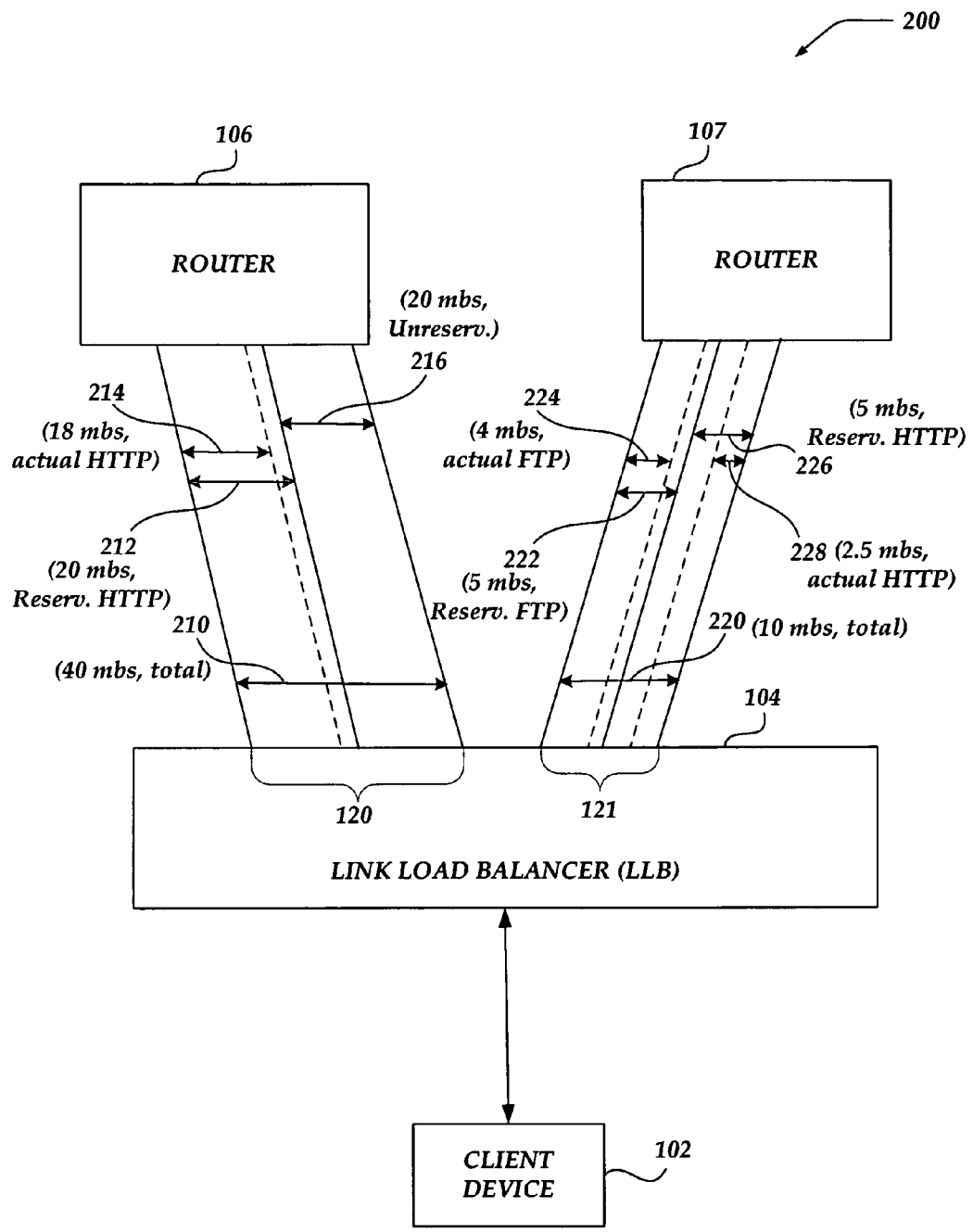
FIG. 2 shows a functional block diagram illustrating an example of network traffic flows across multiple network links.

FIG. 2 shows a functional block diagram illustrating an example network traffic flow across multiple network links. Not all of these components shown in system 200 of FIG. 2 may be required to practice the invention, and variations in the arrangement and type of the components may be made without departing from the spirit or scope of the invention. For example, for ease of illustrating the invention, only two network links are illustrated. However, the invention is not so limited, and many more network links may be balanced in an integrated rate shaping/load balancing manner. Moreover, the network links may each have associated with it a different determined service level that indicates a different allocation of the link resource based, at least in part, on a class.

As shown in the figure, system 200 includes routers 106-107, LLB 104, and client device 102. Client device 102 is in communication with LLB 104. LLB 104 is in communication with router 106 through network link 120, and router 107 through 121. Routers 106-107, LLB 104, and client device 102 operate as described above in conjunction with FIG. 1.

As shown as examples, network link 120 may be configured to provide total bandwidth 210. In this example, total bandwidth 210 is approximately 40 Mbps. Total bandwidth 210 may be configured to allocate bandwidth across various rate classes. As shown, for example, reserved HTTP bandwidth 212 allocates a bandwidth of approximately 20 Mbps to HTTP network traffic. In one embodiment, the reserved bandwidth represents a minimum bandwidth reserved for the identified class. That is, if the additional bandwidth is unused, or unreserved, the identified class may be allocated more than its reserved bandwidth.

Similarly, network link 121 may be configured to provide total bandwidth 220. In this example, total bandwidth 220 is approximately 10 Mbps. Total bandwidth 220 may also be configured to allocate bandwidth across various rate classes. As shown, for example, reserved HTTP bandwidth 226 allocates a bandwidth of approximately 5 Mbps to HTTP network traffic, while reserved FTP bandwidth 222 allocates bandwidth of approximately 5 Mbps to FTP network traffic.

It is noted, however, that while the above illustration allocates a bandwidth link resource, the invention is not so limited. For example, other link resources may be allocated including a peak packet transmission rate, a peak rate tolerance, or so forth.

Illustrative Network Device

Figure 3:
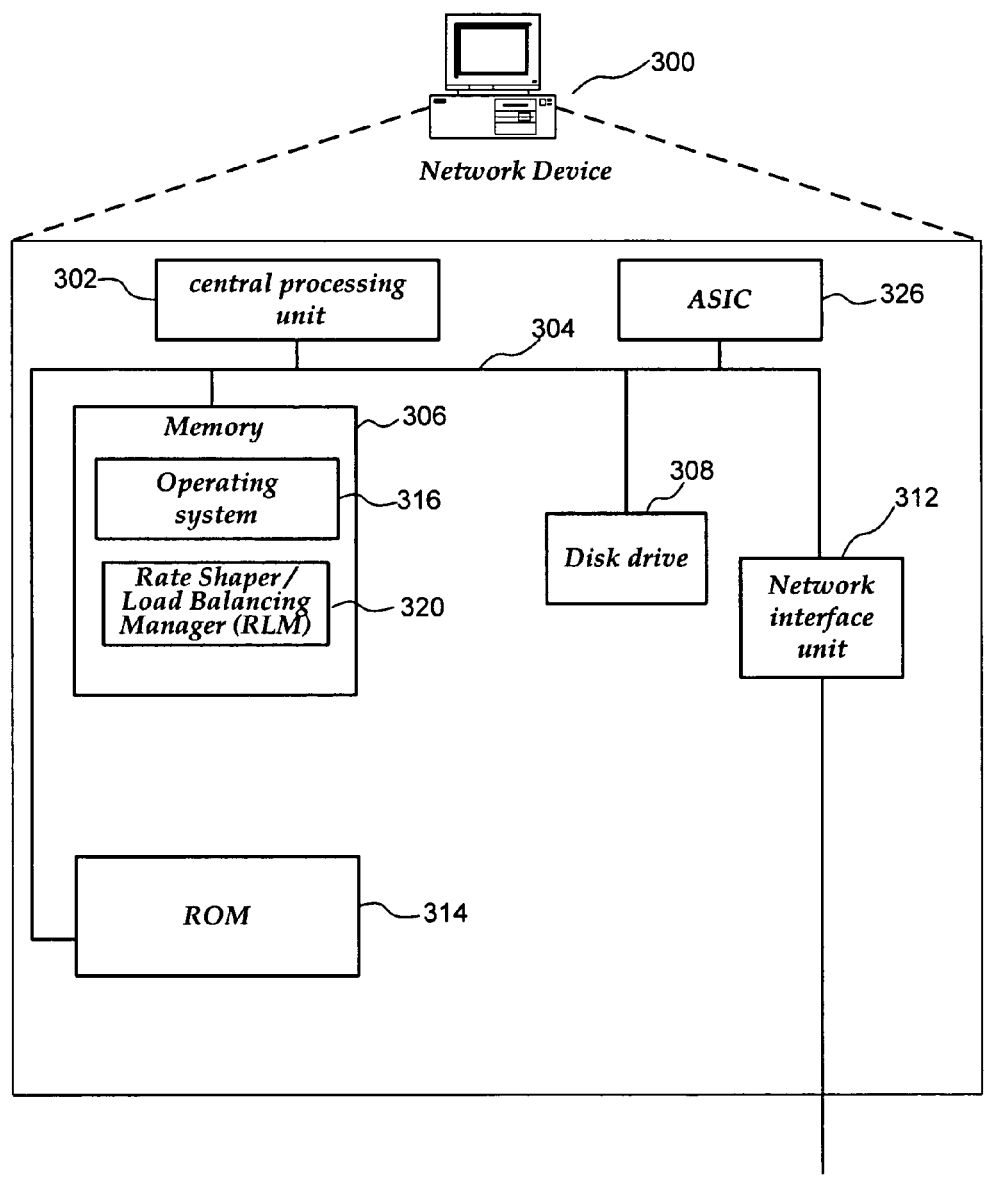
FIG. 3 shows one embodiment of a network device that may be included in a system implementing the invention.

FIG. 3 shows one embodiment of a network device that may operate as LLB 104 of FIG. 1. Network device 300 of FIG. 3 may include many more or less components than those shown. The components shown, however, are sufficient to disclose an illustrative embodiment for practicing the invention.

As illustrated in FIG. 3, network device 300 includes a central processing unit (CPU) 302, mass memory, and a network interface unit 312 connected via a bus 304. Network interface unit 312 includes the necessary circuitry for connecting network device 300 to network 105 of FIG. 1, and is constructed for use with various communication protocols including the TCP/IP and UDP/IP protocol. Network interface unit 312 may include or interface with circuitry and components for transmitting messages and data over a wired and/or wireless communications medium. Network interface unit 312 is sometimes referred to as a transceiver, Network Interface Card (NIC), or the like.

In one embodiment, network device 300 includes one or more Application Specific Integrated Circuit (ASIC) chip 326 connected to bus 304. As shown in FIG. 3, network interface unit 312 may connect to 304 bus through at least one ASIC chip. ASIC chip 326 can include logic that enables at least some of the actions of network device 300. For example, in one embodiment, ASIC chip 326 can be employed to perform packet processing functions on incoming and/or outgoing packets. In one embodiment, ASIC chip 326 performs logic for Rate shaper/Load Balancing Manager (RLM) 320. In one embodiment, network device 300 includes one or more field-programmable gate arrays (FPGA) (not shown), instead of, or in addition to, ASIC chip 326. A number of actions for the network device can be performed by ASIC chip 326, an FPGA, CPU 302 with instructions stored in memory, or any combination of actions performed by the ASIC chip, FPGA, and CPU.

Computer storage media may include volatile and nonvolatile, removable and non-removable media implemented in any method or technology for storage of information, such as computer readable instructions, data structures, program modules or other data. Examples of computer storage media include RAM 306, ROM 314, EEPROM, flash memory and/or any other memory architecture, CD-ROM, digital versatile disks (DVD) and/or any other optical storage, magnetic cassettes, magnetic tape, magnetic disk storage and/or any other magnetic storage devices, and/or any other medium that can store information that can be accessed by a computing device. Consistent with In re Nuijten, 500 F.3d 1346 at 1356, which specifically held that propagating signals are not manufactures within the meaning of 35 U.S.C. §101 because they are not tangible, the term "tangible computer-readable storage medium", as used herein throughout the specification and the claims, does not include propagating signals per se, because propagating signals per se are not tangible as specifically held in Nuijten.

Network device 300 may also include an input/output interface (not shown) for communicating with external devices or users.

Network device 300 can also be implemented as one or more "blades" where the term "blade" refers to one of multiple electronic circuit boards or cards that are installed in a hardware chassis with a backplane. An exemplary blade may include one or more processors, volatile and non-volatile memory, interfaces suitable for communicating information to and from the blade, and other components for enabling the operation of one or more applications. A blade may also include a specialized interface for the backplane and other interfaces, such as a USB port, FIREWIRE port, serial port, RF interface, IR interface, Ethernet interface, IDE controller, and the like. An application running on a blade may employ any of these interfaces to communicate information to other applications running on other blades and/or devices coupled to the blade server. Network device 300 can also be implemented as a combination of blades and additional components in the chassis.

The mass memory generally includes random access memory ("RAM") 306, read-only memory ("ROM") 314, and one or more permanent mass storage devices, such as hard disk drive 308. The mass memory stores operating system 316 for controlling the operation of network device 300. The operating system 316 may comprise an operating system such as UNIX, LINUX™, or Windows™. In one embodiment, the mass memory may store program code and data for implementing Rate Shaper/Load Balancing Manager (RLM) 320.

RLM 320 is a traffic management component that is configured to analyze a request for a network connection and to employ an integrated rate shaping approach to select a network link to load balance traffic, including the request, across multiple network links. RLM 320, or another device or component, may determine a rate class for which the request may be associated. RLM 320 may further determine an available link resource, such as bandwidth, for each of the multiple network links for which RLM 320 may manage. In one embodiment, RLM 320 determines a percent available bandwidth for the requested rate class within each of the available network links. RLM 320 may then select a network link based on various load balancing mechanisms based, in part, on the rate class. In one embodiment, RLM 320 may further employ a weighted combination of a variety of other network metrics to load balance traffic, including the request, across the multiple network links. Such other network metrics may include failure rates of pings over a particular network link, link type, or the like. RLM 320 may also employ a variety of load balancing mechanisms to further select a network link from at least a subset of available network links for the request. In one embodiment, RLM 320 may elect to reuse an existing connection for the request. RLM 320 may employ a process substantially similar to that described below in conjunction with FIGS. 4-5.

Generalized Operation

Figure 4:
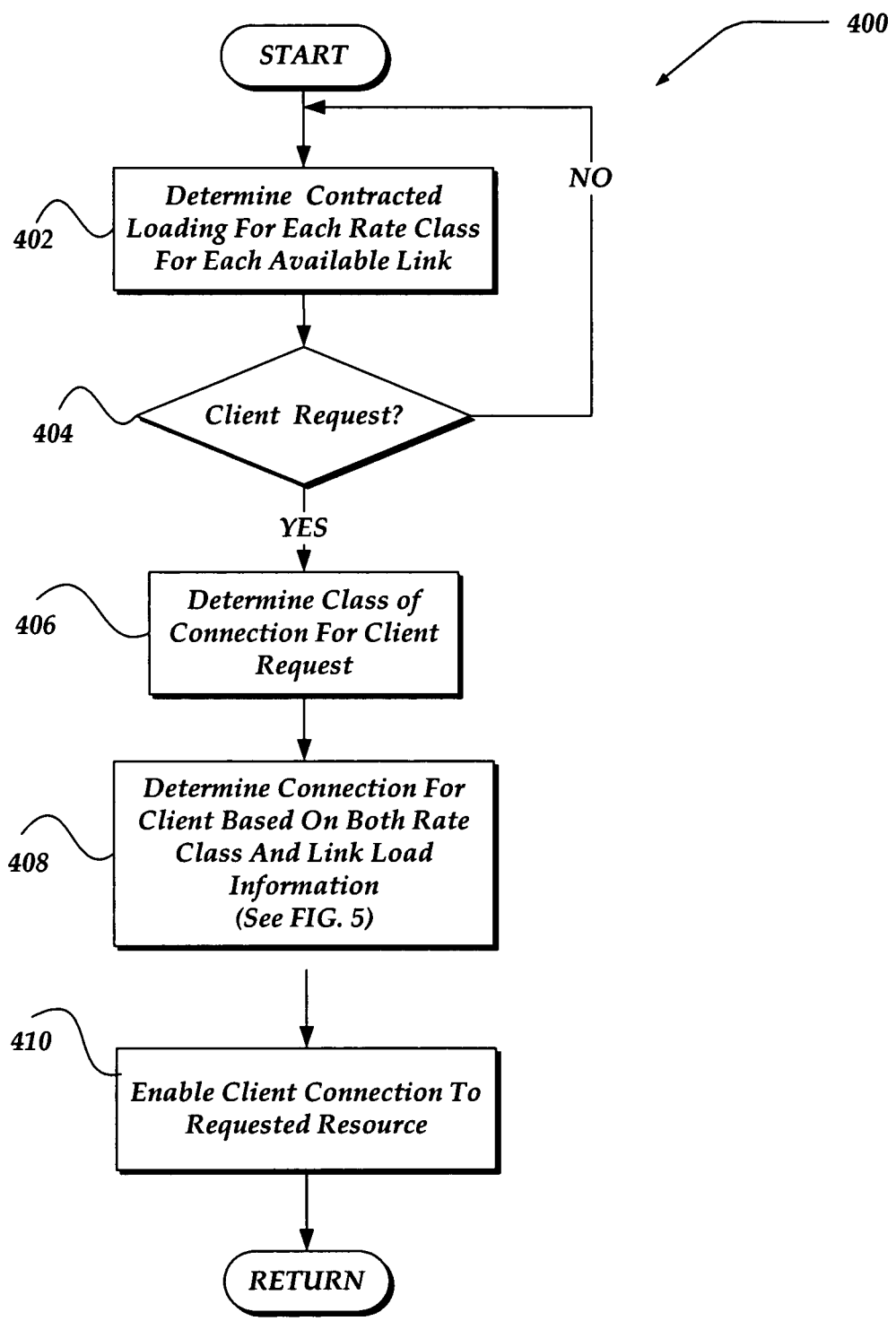
FIG. 4 illustrates a logical flow diagram generally showing one embodiment of a process for enabling a client connection to a requested resource by balancing rate shaping classes and link loads.

The operation of certain aspects of the invention will now be described with respect to FIGS. 4-5. FIG. 4 illustrates a logical flow diagram generally showing one embodiment of a process for enabling a client connection to a requested resource by balancing rate shaping classes and link loads.

As shown in FIG. 4, flow 400 begins, after a start block, at block 402, where each available network link is evaluated for its loading for each rate class. Using FIG. 2 as an example, 20 Mbps is determined to be the loading for HTTP network traffic for network link 120. Similarly, 5 Mbps is the loading for HTTP network traffic, and 5 Mbps is the loading for FTP network traffic on network link 121.

Processing next proceeds to decision block 404 where a determination is made whether a request for a network connection is received from a client, such as client device 102 of FIG. 1. If a request is received, processing flows to block 406; otherwise, processing loops back to block 402. Looping continues until a client request for a network connection is received. Looping is performed, for example, to enable implementation of dynamic changes to a determined service level associated with a network link.

At block 406, the client request is evaluated to determine which rate class to classify the request. The determination of which rate class may be performed using any of a variety of mechanisms, including examining a request's protocol, packet headers, packet payload, or the like. For illustrative purposes only, we will assume that the client's request is an HTTP traffic flow request.

Processing continues next to block 408, which is described in more detail below in conjunction with FIG. 5. Briefly, however, at block 408 an integrated rate shaping load balancing decision is performed based on at least an available rate class for each available network link. In one embodiment, various other network metrics may be used to further select the network link from multiple available network links for which to route the client's request.

Processing then proceeds to block 410, where the selected network link is employed to enable the client connection to the requested resource. Upon completion of block 410, processing may return to a calling process to perform other actions.

Figure 5:
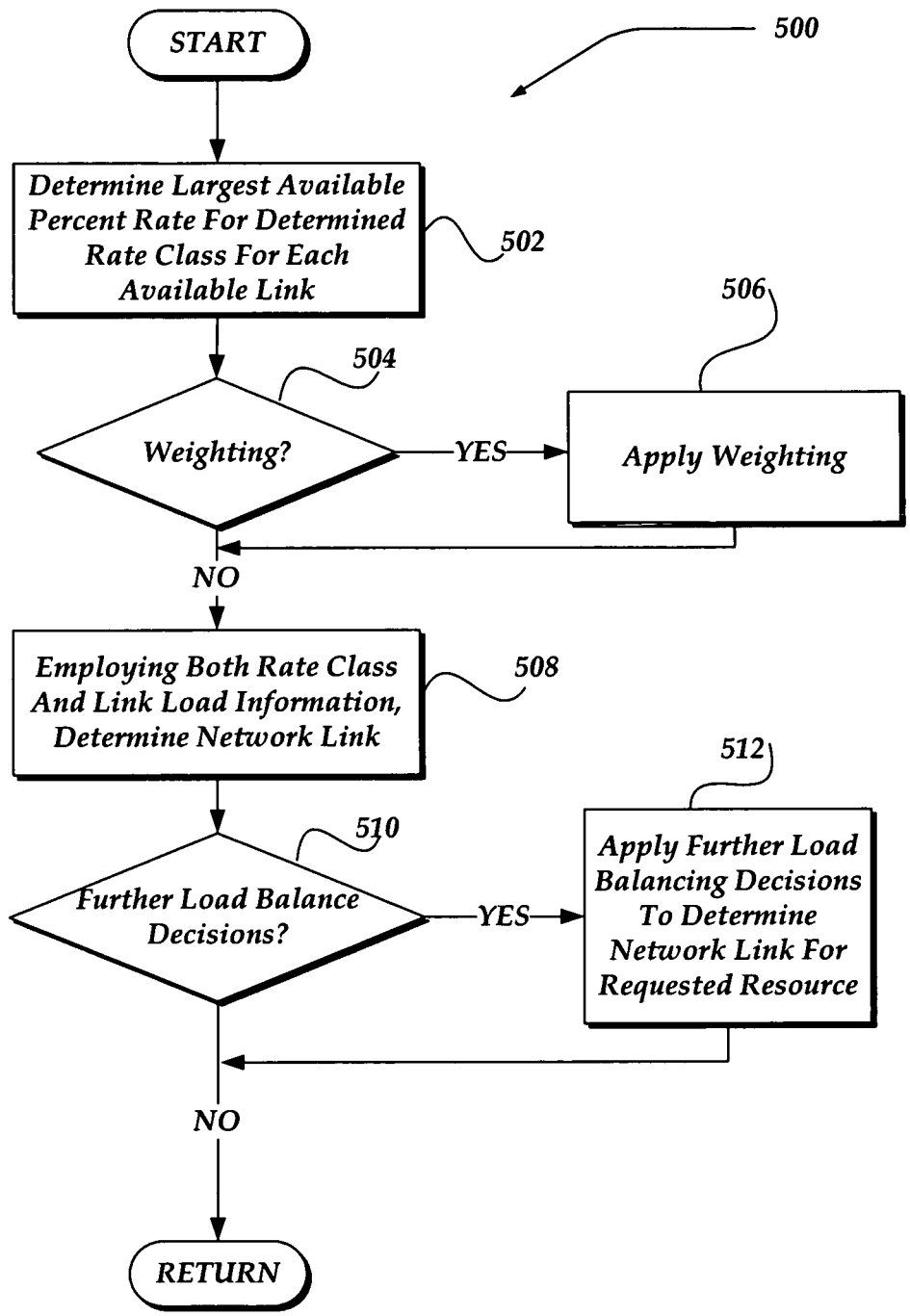
FIG. 5 illustrates a logical flow diagram generally showing one embodiment of a sub-process for selecting a network link from a plurality of network links using an integrated rate shaping/load balancing approach, in accordance with the invention.

FIG. 5 illustrates a logical flow diagram generally showing one embodiment of a process for determining a client connection based in part on rate shaping classes and available link loads. Process 500 of FIG. 5 may represent one embodiment of block 408 of FIG. 4.

Process 500 begins, after a start block, at block 502, where a determination is made to identify a largest available bandwidth for the requested rate class from each available network link. Determination of an available bandwidth for each network link is premised on current use of each network link by rate class and reserved bandwidth for each network link by rate class. For example, using FIG. 2 and the HTTP rate class, network link 120 indicates that approximately 20 Mbps (reserved) minus the currently used 18 Mbps or approximately 2 Mbps is available. A percent available bandwidth may also be determined as (2 Mpbs/20 Mbps)*100 or approximately 10% Similarly, for network link 121 for the HTTP class, the available percent rate may be determined as 5 Mbps (reserved) minus 2.5 Mbps (currently used) or approximately 2.5 Mbps (approximately 50%). The available rate may then be used in subsequent determinations, as described below, either as the absolute amount of bandwidth, the available percent rate, or a combination of both metrics.

Processing then flows to decision block 504 where a determination is made whether to apply a weighted metric to the results. Such weighted metric may take into account various factors, such as a cost of a network link to a client, or the like. If a weighted metric is to be employed, processing branches to block 506; otherwise, processing flows to block 508. A calculation may include a randomization factor, so that the link with the most available bandwidth for the rate class is selected approximately proportionally to the availability as compared with other links.

At block 506, various weights may be applied to the metrics of interest to enable an integrated rate shaping/load balancing decision. For example, a particular client request may receive a lower cost if one network link is employed over another network link. Thus, a weighting may be applied that might favor that network link over the others for that client request. However, the invention is not limited to this example, and other weighted metrics and/or weights may be applied, without departing from the scope or spirit of the invention. In any event, processing next flows to block 508.

At block 508, the results of block 502 and optionally block 506 is employed to determine at least one network link that may be employed to service the client's request. In one embodiment, the network link with the highest availability of bandwidth for the requested class may be selected to service the client's request. Thus, without additional weighting, network link 121 of FIG. 1 might be selected to service the client's HTTP traffic flow request. It may arise however, that several network links may be useable for servicing the client's request. This may arise for several reasons. For example, several network links may provide substantially similar availabilities for the requested class.

Processing continues to decision block 510, where a determination is made whether there are further load balancing decisions that might be applied to select the network link. If there are further load balancing decisions to employ, processing branches to block 512. Otherwise, it is likely that a single network link has been selected for use at block 508. Therefore, processing returns to a calling process (such as block 410 of FIG. 4) where the client's request is allocated to the selected network link for use in establishing the requested client connection.

At block 512, further load balancing mechanisms may be employed to select the network link, including, but not limited to round-robin, a hash of a network address associated with the client request, a topology, or the like. In any event, upon selection of the network link, processing returns to the calling process (such as block 410 of FIG. 4) where the client's request is allocated to the selected network link for use in establishing the requested client connection.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. A network device for managing a communication over a network, comprising:
    a transceiver for receiving and sending packets; and
    a traffic management component that is programmed to perform actions comprising: receiving a request for a network connection; determining a rate class associated with the request; for each network link in a plurality of network links, wherein each network link is directed to a different network node, determining an availability of a link resource for the determined rate class;
    employing the availability of the link resource for the determined rate class and using a weighted combination of a plurality of network metrics including failure rates of pings, to select a network link for the request from the plurality of network links based on a load balancing mechanism; and
    employing a network connection over the selected network link for the request; and
    directing any subsequent packets that are part of the same communication flow, to the same network link, so as to maintain the state information of the communication flow.

2. The network device of claim 1, wherein the availability of the link resource further comprises a bandwidth availability for each network link.

3. The network device of claim 1, wherein the availability of the link resource further comprises a percent bandwidth availability for each network link.

4. The network device of claim 1, wherein determining the availability of the link resource for the determined rate class further comprises:
    determining, for each network link, a reserved amount of the link resource;
    determining, for each network link, a current use of the link resource; and
    determining, for each network link, the availability of the link resource based on a difference between the current use and the reserved amount.

5. The network device of claim 1, wherein selecting the network link further comprises selecting a network link from the plurality of network links based, in part, on a highest availability of a network resource.

6. The network device of claim 1, wherein employing a network connection, further comprises reusing an existing network connection over the selected network link for the request.

7. The network device of claim 1, wherein the request is received from a mobile device.

8. A method of managing a communication between a client and a server over a network, comprising:
    receiving, from the client, a request for a network connection; determining a rate class associated with the request; for each network link in a plurality of network links, wherein each network link is directed towards a different network node, determining an availability of a link resource for the determined rate class;
    employing a network device to employ the availability of the link resource for the determined rate class and using a weighted combination of a plurality of network metrics including failure rates of pings, to select a network link for the request from the plurality of network links based on a load balancing mechanism;
    establishing a network connection over the selected network link towards the server for the request; and
    directing any subsequent packets that are part of the same communication flow, to the same network link, so as to maintain the state information of the communication flow.

9. The method of claim 8, wherein the link resource further comprises a bandwidth availability for each network link.

10. The method of claim 8, wherein the link resource further comprises a percent bandwidth availability for each network link.

11. The method of claim 8, wherein determining an availability of the link resource for the determined rate class further comprises determining the availability based on a current use of the link resource and a reserved amount of the link resource for each network link.

12. A non-transitory computer-readable storage medium having computer-executable instructions, the computer-executable instructions when installed onto a computing device enable the computing device to perform actions for managing a communication over a network, comprising:
    sending a request for a network connection, wherein a rate class is associated with the request;
    determining for each network link in a plurality of network links an availability of a link resource for the rate class, wherein each network link is directed towards a different network node in the network;
    selecting a network link from the plurality of network links and using a weighted combination of a plurality of network metrics including failure rates of pings, to balance the link resource for the rate class across the plurality of network links;
    enabling the requested network connection to be established over the selected network link; and
    directing any subsequent packets that are part of the same communication flow, to the same network link, so as to maintain the state information of the communication flow.

13. The manufacture of claim 12, wherein the link resource further comprises a bandwidth availability for each network link.

14. The manufacture of claim 12, wherein the link resource further comprises a percent bandwidth availability for each network link.

15. The manufacture of claim 12, wherein balancing the link resource for the rate class across the plurality of network links further comprises selecting a network link from the plurality of network links based, in part, on a network link having a highest availability of the network resource.

16. A network device for managing a communication between a client and a server, comprising:
   a transceiver to exchange data between the client and the server;
   a traffic management component that is programmed to perform actions comprising: receiving a request for a network connection; and associating a target network link with the request for a network connection, by using a weighted combination of a plurality of network metrics including failure rates of pings to select the target network link from a plurality of network links based, in part, on a load balancing mechanism that employs a rate class metric for each of a plurality of network links, wherein each network link in the plurality of network links is directed to a different network node in a path between the client and the server, then enable the requested network connection to be established over the selected network link;
   and direct any subsequent packets that are part of the same communication flow, to the same network link, so as to maintain the state information of the communication flow.

17. The network device of claim 16, the means for selecting the target network link further comprising program code that is programmed to perform actions comprising:
   determining a rate class associated with the request; and
   determining, for each network link in the plurality of network links, an availability of a link resource for the rate class.

18. The network device of claim 16, the means for selecting the target network link further comprising program code that is programmed to perform actions comprising:
   determining a rate class associated with the request; and
   determining, for each network link in the plurality of network links, an availability of a link resource for the rate class based on a current use and a reserved amount.

19. The network device of claim 16, wherein the traffic management component is further programmed to forward the request over the selected target network link.

* * * * *